United States Patent
Unitt et al.

(10) Patent No.: US 7,272,137 B2
(45) Date of Patent: Sep. 18, 2007

(54) DATA STREAM FILTERING APPARATUS AND METHOD

(75) Inventors: Brian Unitt, Bishops Stortford (GB); Michael Grant, Bishops Stortford (GB); David Phillips, Bishops Stortford (GB); Matthew Allen, Old Harlow (GB)

(73) Assignee: Nortel Networks Limited, St. Laurent, Quebec (CA)

(*) Notice: Subject to any disclaimer, the term of this patent is extended or adjusted under 35 U.S.C. 154(b) by 1032 days.

(21) Appl. No.: 10/107,876

(22) Filed: Mar. 27, 2002

(65) Prior Publication Data

US 2002/0146026 A1 Oct. 10, 2002

Related U.S. Application Data

(60) Provisional application No. 60/290,948, filed on May 14, 2001.

(30) Foreign Application Priority Data

May 14, 2000 (GB) ............................. 0111724.1

(51) Int. Cl.
*H04L 12/56* (2006.01)

(52) U.S. Cl. ............... 370/389; 370/488; 398/166

(58) Field of Classification Search ............. 370/392, 370/390, 356, 238, 389, 352, 236.2, 349, 370/395.1, 324, 341, 488; 709/238–242, 709/245, 236, 223; 398/43, 89, 99, 70, 98, 398/54, 153, 166
See application file for complete search history.

(56) References Cited

U.S. PATENT DOCUMENTS

| | | | | |
|---|---|---|---|---|
| 5,959,989 | A | 9/1999 | Khabardar | 370/390 |
| 6,023,467 | A * | 2/2000 | Abdelhamid et al. | 370/236.2 |
| 6,111,673 | A | 8/2000 | Chang | 398/79 |
| 6,147,995 | A | 11/2000 | Andlauer | 370/392 |
| 6,526,056 | B1 * | 2/2003 | Rekhter et al. | 370/392 |
| 6,587,457 | B1 * | 7/2003 | Mikkonen | 370/356 |
| 2002/0176404 | A1* | 11/2002 | Girard | 370/352 |
| 2005/0083936 | A1* | 4/2005 | Ma | 370/392 |

OTHER PUBLICATIONS

Handley M R et al, "A Comparison of WDM PON Architectures" Proceedings of the European Conference on Networks and Optical Communications 1999. NOC'99 Broadband Access and Technology, Amsterdam, IOS Press, NL, vol. Part 1. 1999, pp. 141-147, XP000829377, ISBN: 90-5199-496-6, p. 144.

(Continued)

*Primary Examiner*—John Pezzlo
(74) *Attorney, Agent, or Firm*—Barnes & Thornburg LLP

(57) ABSTRACT

A method and apparatus for filtering data packets in a shared-medium or point-to-multipoint communications network. A filter unit is sent a data packet carrying a filter tag value in a packet addressed to the filter unit. The value is stored in the filter unit and subsequently received packets not addressed to the filter unit itself are forwarded only if they carry the stored filter tag. An embodiment of particular interest applies the method to Ethernet frames over a telecommunications access network (including optical or wireless networks), and uses the VLAN tag field to carry the filter tag information.

24 Claims, 7 Drawing Sheets

OTHER PUBLICATIONS

Ajay Gummalla: "EPON Compliance Architecture" Internet Article, Online Jan. 2002, pp. 1-12, XP002238653, Retrieved from the Internet: URL:http://www.ieee802.org/3/3fm/public/jan02/gummalla_1_0102.pdf Apr. 16, 2003.

Norman Finn: "Two Models for IEEE 802.3ah EPONs" Internet Article, 'Online! Apr. 23, 2002, pp. 1-14, XP002238654 Retrieved from the Internet: <URL:http://www.ieee802.org/1/files/public/docs2002/pon-model-4.pdf Apr. 16, 2003.

* cited by examiner

DATA STREAM FILTERING APPARATUS AND METHOD

RELATED APPLICATIONS

This is the non-provisional filing of Provisional U.S. Application No. 60/290,948 filed on May 14, 2001.

FIELD OF THE INVENTION

The present invention relates to a method and apparatus for filtering streams of data packets in a shared medium or point-to-multipoint communications system and a system incorporating the same.

BACKGROUND TO THE INVENTION

There are many known examples of communications network architectures which make use of shared medium communication between a transmitter and multiple receivers. Architectures include for example point-to-multipoint optical networks and wireless networks, in particular for (but not limited to) telecommunications access networks. Whilst these architectures have many problems in common, they are described here in the context of Passive Optical Networks (PON's) in general and Gigabit Ethernet PON's (GEPON's) in particular.

GEPON's have been proposed as a means of cost effectively providing fibre access to homes and businesses. In such a network, downstream traffic is broadcast to all nodes whereas a Time Division Multiple Access (TDMA) protocol is used to multiplex the upstream traffic onto the PON without collisions.

One significant problem with a GEPON is that all downstream traffic is broadcast and hence visible to all end-nodes, which are likely to be unrelated home or business customers. A security mechanism is required which can filter traffic at the end node in order that each customer will only receive traffic destined for his end-node.

A second problem with a GEPON is that, unlike a conventional Ethernet Access system based on point-to-point links, there are multiple customers associated with a single physical port at the headend. Thus, the headend Access Router or switch can no longer use physical port association as a means of differentiating customer traffic in order to enforce policies such as security, bandwidth allocation, access to particular traffic types, etc. A different mechanism for differentiating customers' traffic is therefore required.

One known approach to filtering downstream traffic destined for a specific Optical Network Unit (ONU) is to filter by MAC address. If each ONU has a single MAC address, and all Ethernet frames for that ONU use this address, then this provides the headend with a sufficient means of differentiation traffic for different customers. There are however several disadvantages to this approach. First, it is likely that the customer will have several Customer Premises Equipment (CPE) devices connected to a local network, each Ethernet device having its own distinct MAC address. Simple layer 2 bridging of traffic destined for these different CPE devices (e.g. PCs, Set Top Boxes etc) cannot therefore be used, forcing the use of a more complex solution such as layer 3 switching via a router. This solution is not however suitable for multicast traffic, such as multicast video, which uses a different multicast MAC address.

A second known approach to tackling the problem is to allow the ONU to use several MAC addresses for its CPE devices, with the ONU bridging the traffic destined for these CPE devices. This however can create significant security problems, as a CPE device such as a PC on one ONU could relatively easily impersonate a device on another ONU and hence steal traffic destined for that ONU. In addition, a PC or Set Top Box could "tune-in" to multicast video traffic purchased by another customer on the PON. Furthermore, a mechanism is required by which the list of MAC addresses to be passed through an ONU can be populated. In any practical system, this mechanism must be automatic and therefore adds further complexity in the ONU.

Both of the above approaches can work successfully if routing or security and multicast functions are built into the ONU, which is then owned and managed by the network provider. In such arrangements the ONU becomes a "trusted" device performing filtering and policing functions, together with other functions such as routing, Network Address Translation (NAT) etc as necessary, under the control of the network operator. This is however an expensive solution, and does not fit the commercial and perhaps regulatory requirements of many operators who require a minimal-functionality ONU capable of providing an inexpensive, simple and clear demarcation point at the edge of their network.

OBJECT OF THE INVENTION

The invention seeks to provide an improved method and apparatus for filtering streams of data packets in a shared-medium or point-to-multi-point communications system whereby to overcome problems associated with the prior art.

SUMMARY OF THE INVENTION

According to a first aspect of the present invention there is provided a method of filtering data packets each comprising an address field and a filter tag field, the method comprising the steps of, at a filtering node: storing a value of a filter tag field; and forwarding subsequently received data packets, other than those addressed to the filtering node, responsive to a comparison between values of their respective filter tag fields and the value of the stored filter tag field, regardless of the value of their respective address fields.

Alternatively the method may comprise the steps of: receiving a first data packet addressed, by means of the address field, to the filtering node; storing the value of the filter tag field of the first data packet; forwarding subsequently received data packets, other than those addressed to the filtering node, responsive to a comparison between values of their respective filter tag fields and the value of the filter tag field of the first data packet, regardless of the value of their respective address fields.

In a preferred embodiment, the data packets are Ethernet data packets.

Preferably, the filter tag field is a Ethernet VLAN tag field.

In a further preferred embodiment, the filter tag field is an MPLS label.

According to a further aspect of the present invention there is provided a method of filtering a stream of data packets each comprising an address field and a filter tag field, the method comprising the steps of, at a filtering node: receiving a data packet; if the address field of the data packet contains the address of the filtering node, storing the value of the filter tag field of the data packet; if the address field of the data packet does not contain the address of the filtering node, forwarding the data packet responsive to a comparison between the filter tag field of the data packet and a previously stored filter tag value.

According to a further aspect of the present invention there is provided a data packet filter comprising: input port arranged to receive a stream of data packets each comprising an address field and an filter tag field; output port arranged to output a stream of data packets each having an address field; and a processor and store; the processor being arranged to receive, at the input port, a first data packet addressed, by means of the address field of the packet, to the data packet filter; to store the value of the filter tag field of the first data packet in the store; to forward subsequent data packets received at the first port responsive to a comparison between values of their respective filter tag fields and the stored value of the filter tag field, regardless of the value of their respective address fields.

In a preferred embodiment, the data packets are Ethernet data packets.

Preferably, the filter tag field is a Ethernet VLAN tag field.

In a further preferred embodiment, the filter tag field is an MPLS label.

In preferred embodiments the input port is one of an optical port and a wireless port.

In a preferred embodiment, the data packet filter is arranged to add tags to upstream traffic.

The data packet filter may also be arranged to remove the tags prior to forwarding said packets to a customer.

The invention also provides for a system for the purposes of communications which comprises one or more instances of apparatus embodying the present invention, together with other additional apparatus.

In particular, according to a further aspect of the present invention there is provided a communications network comprising at least one data packet filter according to the present invention.

According to a further aspect of the present invention there is provided a communications network comprising: a headend node having an output port; a plurality of data packet filters according to the present invention; a shared downstream medium connecting the output port of the headend node to respective input ports of each of the plurality of data packet filters; in which data packets output at the output port of the headend node are transmitted over the shared downlink medium to each of the plurality of data packet filters.

In a preferred embodiment the shared downstream medium is one of an optical medium and a wireless medium.

The communications network may be a telecommunications access network.

The invention also provides for computer software in a machine-readable form and arranged, in operation, to carry out every function of the apparatus and/or methods.

In particular, according to a further aspect of the present invention there is provided a program for a computer in a machine-readable form and comprising; a first portion arranged to receive and store a value of a filter tag field; a second portion arranged to forward subsequently received data packets, other than those addressed to the filtering node, responsive to a comparison between values of their respective filter tag fields and the value of the stored filter tag field, regardless of the value of their respective address fields.

The invention also provides for integrated circuitry arranged, in operation, to carry out every function of the apparatus and/or methods.

In particular, according to a further aspect of the present invention there is provided a application specific integrated circuit comprising: a first portion arranged to receive and store a value of a filter tag filled; a second portion arranged to forward subsequently received data packets, other than those addressed to the filtering node, responsive to a comparison between values of their respective filter tag fields and the value of the stored filter tag field, regardless of the value of their respective address fields.

The invention also provides for signals arranged to support operation of the apparatus and methods.

In particular, according to a further aspect of the present invention there is provided a data signal comprising a sequence of packets each provided with a respective virtual local area network (VLAN) tag identifying a customer to whom that packet is directed and whereby the signal may be filtered such that each customer receives only those packets intended for that customer.

According to a further aspect of the present invention there is provided a method of transmitting data from a head end of a point-to-multipoint network comprising the steps of; at the head end: storing an association between destination addresses and filter tag values, each filter tag value being associated with a filter node reachable via the point-to-multipoint network; receiving data directed to a destination address; identifying a stored filter tag value associated with the destination address; forwarding the data over the point-to-multipoint network in at least one data packet comprising the filter tag value.

In a preferred embodiment, the method additionally comprising the steps of: receiving a request to associate a new filter tag value with a filter unit having an address accessible via the network; updating the association to include a mapping between the address and a new filter tag value; sending a message over the network, addressed to the address of the filter unit, and containing the new filter tag value.

The method may additionally comprise the steps of: receiving a request to disassociate a filter tag value from a filter unit having an address accessible via the network; updating the association to omit any mapping between the address and the filter tag value.

According to a further aspect of the present invention there is provided a head and for a point-to-multipoint network, the head end comprising: a store arranged for storing an association between destination addresses and filter tag values, each filter tag value being associated with a filter node reachable via the network; an input port arranged to receive data directed to a destination address; a processor arranged to identify a stored filter tag value associated with the destination address and to forward the data over the network in at least one data packet comprising the filter tag value.

According to a further aspect of the present invention there is provided a program for a computer in a medium-readable form having code portions arranged to: store an association between destination address and filter tag values, each filter tag value being associated with a filter node reachable via the point-to-multipoint network; receive data directed to a destination address; identify a stored filter tag value associated with the destination address; forward the data over the point-to-multipoint network in at least one data packet comprising the filter tag value.

Multiple access networks allow fibre and exchange end equipment to be shared across groups of end customers, resulting in a more cost effective infrastructure. Advantageously the present invention allows the operator to provide very simple, low cost and low power terminations to a GEPON or other point-to-multipoint network, providing a very clear demarcation point between network and customer-side equipment. The complex, and varying functionality of different customer premises equipment can then be treated independently of the GEPON physical network—potentially the customer will purchase his Customer Premises Equipment (CPE) directly, resulting in significant cost savings to the operator.

The availability of such a system, which could be included as an optional enhancement to a standard product, is likely to increase the attractiveness of such a solution to end customers. It potentially provides both a cost and time to market advantage for such PON and other point-to-multipoint network solutions.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

This invention relates to the implementation of shared medium or point to multipoint communications systems. An important example of these is a passive optical network (PON).

Figure 1:
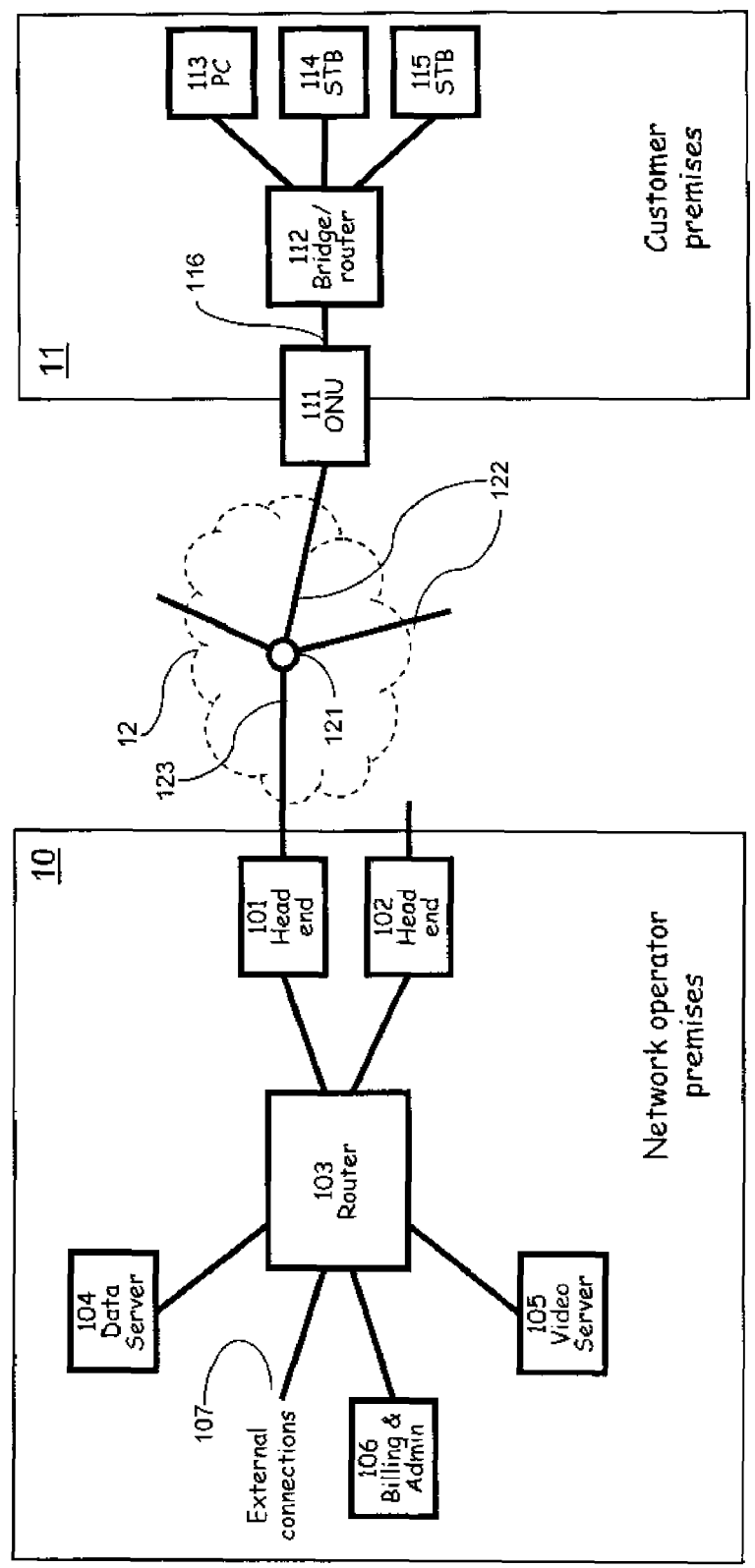
FIG. 1 shows an example of a PON arrangement in accordance with the present invention.

Fibre based access networks intended for delivery of high bandwidth services to end customers can be based on so-called Passive Optical Networks (PON's). FIG. 1 shows a typical network configuration using a PON. In a PON a headend 101, which is typically located at the network operator's local point of presence or premises 10, is connected to a number of optical network units (ONU's) 111 via a fibre network 12 comprising, for example multiple optical fibre paths 122 linked by a passive optical coupler 121 to provide shared upstream communication and point-to-multipoint downstream communication. The network operator typically provides to the customer a number of services 104, 105, either locally from servers located on the operator's premises, or remotely using data links 107 to other sites. In a network using the Internet Protocol (IP) servers are linked to PON head ends via data routers 103. Typically, the operator will also require a billing and administration system 106 to regulate use of the network and charge customers for services used.

On the customer premises 11, traffic received by the ONU 111 for a particular customer leaves the ONU on a customer premises port 116 which is connected into the customer premises network 112-115. Similarly, upstream traffic originating on the customer premises enters the ONU on the customer premises port 116 for onward transmission by the ONU. The customer premises network supports multiple terminal devices including, for example, Set Top Boxes (STBs) 114-115 for delivery of video services and Personal Computers (PCs) 113 for data services. Optionally, multiple customer premises devices can be interconnected and linked to a single ONU port using conventional networking equipment such as bridges and routers 112. Preferably, the ONU customer premises network port 116 uses a readily available data networking standard, such as Ethernet 100baseT.

Some network operators require the ONU to be externally mounted to allow easy access by service technicians. In such circumstances it is particularly advantageous to minimise the size and complexity of the ONU.

Figure 2:
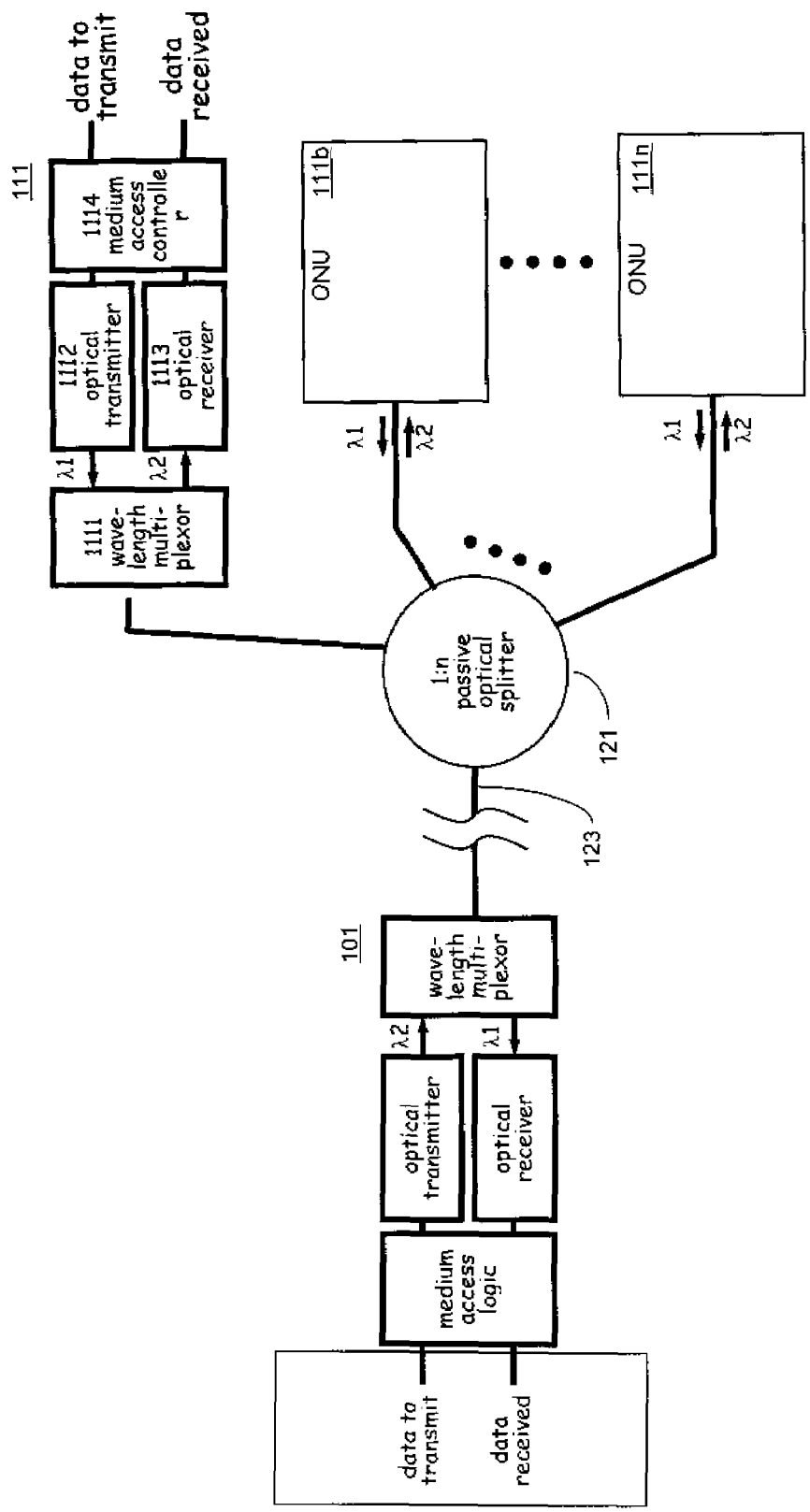
FIG. 2 shows a second example of a PON arrangement in accordance with the present invention.

FIG. 2 illustrates a possible configuration of the PON itself in more detail. A single fibre connection 123 links the headend to a passive optical splitter 121 which divides the downstream optical power equally between a number of fibres 122, each of which terminates at an ONU 111, 111b-111n. Signals sent downstream from the headend arrive at a reduced power level at all ONUs. Each ONU converts 1113 the optical signal to an electrical signal and decodes the information. The information includes addressing information which identifies 1114 which components of the information flow are intended for a particular ONU. In the upstream direction, each ONU is allocated a time interval during which it is permitted to impress an optical signal on the upstream fibre. The signals from all ONU's are combined at the optical splitter 121 and pass over the common fibre link 123 to the headend 101. Signals sourced from any ONU propagate only to the headend. The upstream network may use separate fibre links and splitter, or may use the same network as the downstream direction but using a different optical wavelength, $\lambda 1$, $\lambda 2$.

In one possible arrangement, each ONU is granted permission to transmit by a control frame sent in the downstream direction, addressed to the MAC address of the ONU. At the end of the allotted slot, a second control frame withdraws permission to transmit. ONU's are polled in turn to allow each ONU to send any queued traffic during its allotted time slot. A more detailed description of such a method is to be found in co-pending patent application U.S. Ser. No. 09/804,316 "Multiple Access System for Communications Network", the contents of which are included herewith by reference.

Preferably, traffic not intended for customer devices connected to a particular ONU is filtered out by the ONU, such that all traffic emerging on a particular customer interface is specifically directed to that customer. This not only reduces the traffic load on the customer premises network but also improves security since customers do not receive traffic intended for others.

IEEE standard 802 allows groups of terminal devices conforming to the Ethernet standard to be grouped into a Virtual Local Area Network (VLAN). In a VLAN, a logically separate group of terminals is established within a larger group of terminals physically connected to the same LAN infrastructure. In a network not using VLAN's, terminals physically connected to the same segment of a LAN exchange information at layer 2, based on layer 2 (MAC) addressing information Terminals grouped into a VLAN do not exchange information packets at layer 2 with other terminals connected to the same physical infrastructure which are not members of the same VLAN. Instead, information is exchanged between the segregated groups at layer 3 using IP or other higher layer forwarding. In Ethernet networks, VLANs are identified and distinguished by placing an additional address field, known as the VLAN tag, in the data frame following the MAC source and destination addresses but preceding the payload of the frame which, in turn, contains the source and destination addresses for the layer 3 protocol, for example, IP.

Figure 3:
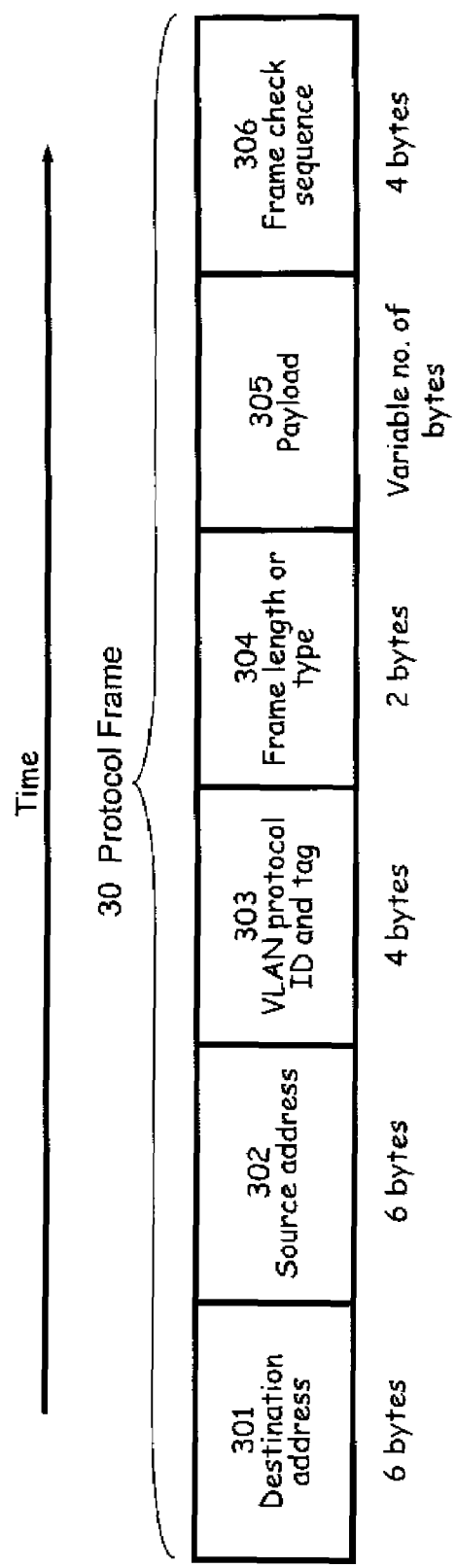
FIG. 3 shows an example of a protocol frame structure in accordance with the present invention.

FIG. 3 illustrates a MAC frame 30 containing a VLAN protocol and tag field 303, along with destination address 301, source address 302, frame length or type information 304, payload 305, and frame check sequence 306 fields. The VLAN tag itself is allocated 12 bits of the 'VLAN protocol ID and tag' field 303, thereby offering 4096 distinct values, some of which are reserved. This therefore supports approximately 4000 distinct VLAN's on a given LAN segment.

Figure 4:
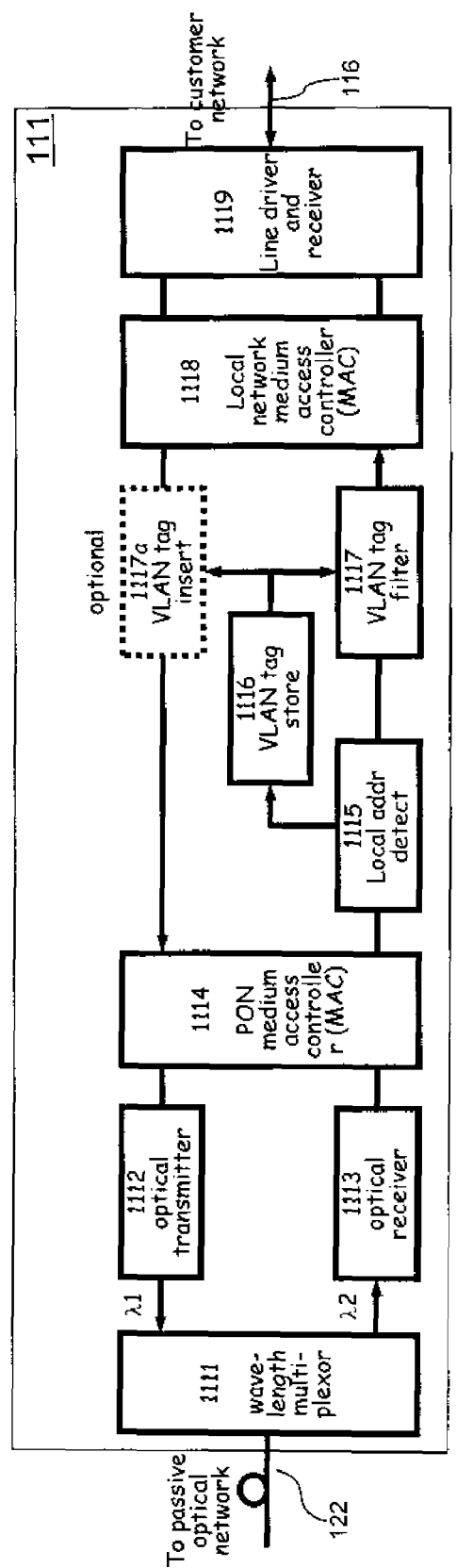
FIG. 4 shows an example of an ONU in accordance with the present invention.

In the present invention, a VLAN tag value, preferably unique, is assigned to each customer on the network segment. The headend networking equipment 101 is configured to add the correct tag to downstream traffic destined for a given customer. The ONU 111 can then be configured to forward to the customer premises port only those Ethernet frames carrying the correct VLAN tag. In this way, the ONU does not need to examine the destination MAC address field of each frame and compare it to a list of local addresses. Furthermore, complex functions associated with populating the address table are no longer needed. An example ONU block diagram is shown in FIG. 4.

In a preferred embodiment, the ONU deletes the VLAN tag in downstream frames before forwarding them via the customer port 116 as part of the VLAN tag filter function 1117, so that the VLAN tag is not propagated into the customer premises network 11.

Conveniently, the ONU can add the customer-specific VLAN tag to frames of upstream traffic originating on the customer premises. The headend networking equipment can then straightforwardly identify traffic from a given customer in order to provide network policy filtering, for example to limit the traffic from a particular customer to a contracted rate.

In a practical network, it is highly desirable that the system should be 'plug and play', that is, no re-configuration of the ONU should be needed when attaching a new ONU to an existing system. Preferably, it should not be necessary to pre-configure an ONU for a particular VLAN tag. This invention provides a means whereby an unconfigured ONU can 'learn' its VLAN tag from the network without manual intervention at the customer premises.

Firstly, the MAC address of the new ONU must become known to the system. This can be done by manual intervention at the headend, but preferably is performed automatically. Co-pending patent application U.S. Ser. No. 09/804,316 "Multiple Access System for Communications Network", discloses a method for accomplishing this.

Once the MAC address of a new ONU is known to the system, the ONU can be included in the normal polling loop and thus allocated an upstream transmission time slot in which to send its queued upstream traffic.

Next, the headend of the system must determine the VLAN tag to be used for the new customer. Various strategies could be adopted by the network operator to generate a suitable VLAN tag value. For example, a set of VLAN values, corresponding to the maximum number of ONU's allowed on each PON, could be allocated to each headend PON port and an unused value could be selected from this list. In a practical network, it is likely that other items of headend networking equipment will need to be configured with the VLAN tag value. The VLAN tag must be unique at least within the PON to which the new customer is connected: that is, unique per controlling head-end. Conveniently, many PONs can be grouped based on the partitioning of the headend networking equipment and each customer within the PON group can be assigned a unique VLAN tag. Since the VLAN address space allows for up to around 4000 distinct VLAN's, at most 4000 customers can be grouped in this way.

Figure 5:
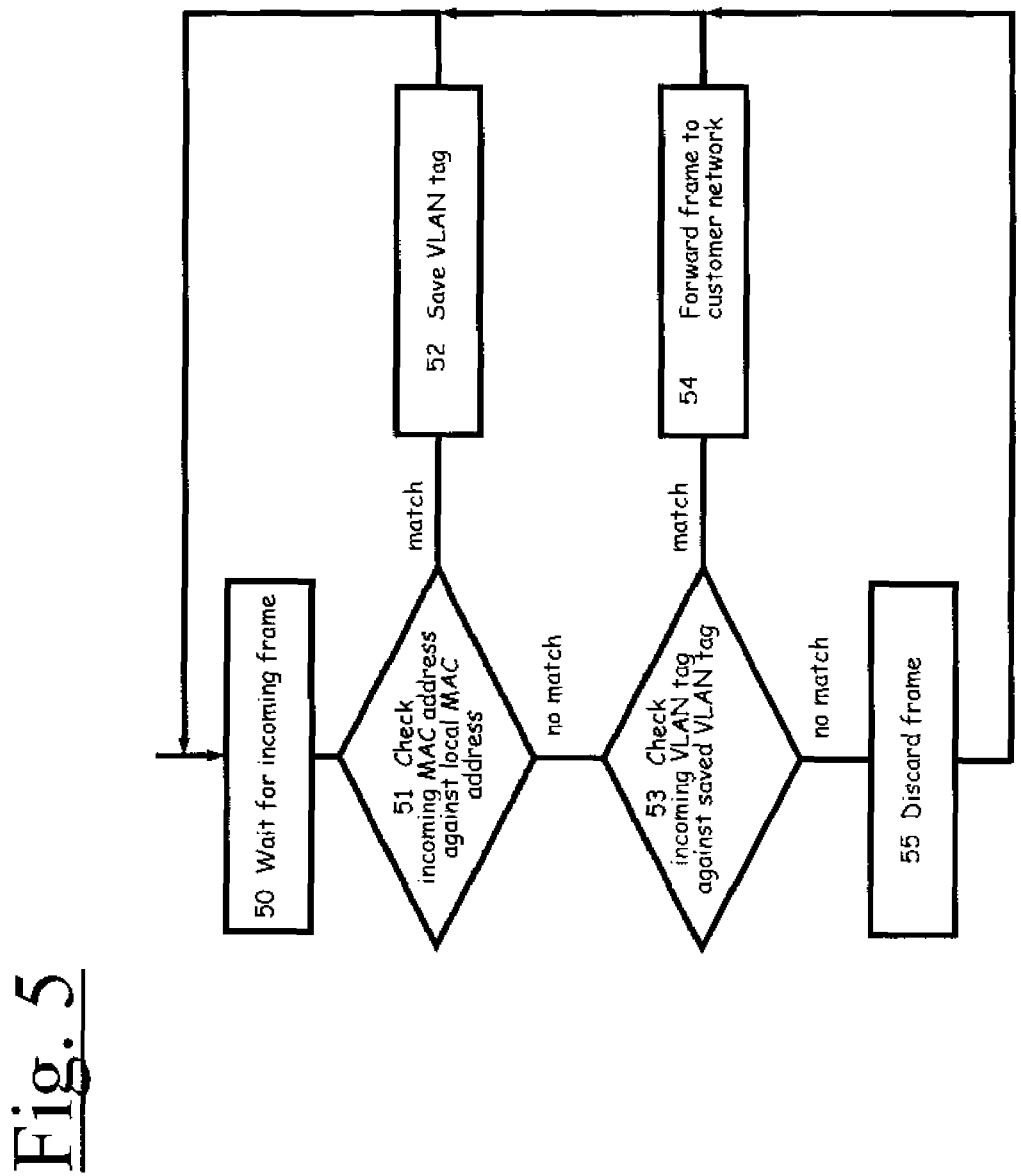
FIG. 5 shows an example of a frame monitoring method in accordance with the present invention.

Referring now to FIG. 5, once the ONU MAC address and the desired VLAN tag are known to the headend, the headend sends a frame addressed to the MAC address of the new ONU and carrying the VLAN tag to be used by the ONU to filter its local traffic and identify its upstream frames. On receipt 50 of such a 'VLAN notification' frame addressed to its own MAC address 51, an ONU reads the VLAN tag and saves the value locally 52.

Preferably, though not necessarily, the VLAN tag specified in the VLAN notification frame is transmitted in the MAC header in the format and position specified for VLAN tags in the IEEE 802 standard, as illustrated in FIG. 3. Alternatively, or in addition, the numerical value of the customer specific VLAN tag can be transmitted within the payload of the VLAN notification frame.

On receiving any frame not addressed to its own MAC address 51, the ONU compares 53 the VLAN tag with the previously saved value. If the tags match, the frame is forwarded 54 via the local customer premises interface. If there is no match, the frame is discarded 55. Referring to FIG. 4, these functions are performed in the ONU 111 by a local address detector 1115, a VLAN tag store 1116, and a VLAN tag filter 1117. Appropriate physical and MAC layer functionality is provided 1111-1114, 1118-1119 facing the upstream 122 and downstream 116 links to handle basic receipt and transmission of frames.

Optionally, the saved VLAN tag value is inserted 1117a in upstream frames arriving on the local customer premises interface 116 before being forwarded on the PON during the ONU's active time slot.

The VLAN tag value associated with a particular ONU can be changed as desired by the network operator by sending a new tag in a frame addressed to the MAC address of the ONU. Preferably, frames addressed to the MAC address of the ONU are not forwarded on the local customer premises interface.

Advantageously, for security reasons, and in particular to prevent eavesdropping of PON traffic intended for other customers, frames arriving on the customer premises interface of the ONU addressed to the MAC address of the ONU do not cause the saved VLAN tag value to be updated.

A reduced functionality ONU employing VLAN tags to filter downstream traffic is referred to as a "Thin ONU".

According to the Ethernet standard, frames contain a cyclic redundancy check which can be tested at the receiving end of the link to check for transmission errors. A frame containing errors is normally discarded, so that a corrupted VLAN notification frame would be lost. Optionally, to improve resilience to such transmission errors, multiple VLAN notification frames could be transmitted from the headend. Other improvements to the detail of this protocol, such as multiple transmissions coupled to a voting system, will be evident to those skilled in the art.

Optionally, VLAN notification frames may be sent periodically to all active ONU's in case of corruption within the ONU itself. VLAN tags assigned to specific ONU's may also be changed dynamically at any time under headend control without materially affecting traffic throughput.

In its simplest implementation, the Thin ONU possesses one network facing data port implementing the PON protocol and one customer facing port. In one preferred embodiment, the network-facing PON port uses a gigabit Ethernet PON protocol, such as that described in co-pending patent application U.S. Ser. No. 09/804,316 "Multiple Access System for Communications Network". Preferably, the customer-facing data port implements the Ethernet protocol. Preferably, this is an interface to the IEEE 100baseT standard.

The basic system described above allocates a single VLAN to each customer. Some customers, particularly business customers, may require more than one logically separate network connection e.g. in order to implement multiple Virtual Private Networks (VPN's). For example, a business might wish to segregate its information services, using distinct services provider networks for voice and data services whilst using a common physical network connection. The basic system can be extended to allow operation under such circumstances by allocating more than one VLAN to an ONU, yet without a significant increase in ONU complexity.

Suppose a business customer requires three distinct VPNs. Each VPN is allocated a distinct VLAN tag value from a numerically contiguous group, where the size of the group is an integer power of two (in this case, four) and the lowest tag value in the group is an integer multiple of the group size. Where four tags are needed at an ONU, a valid set of tag values would be, for example, 1000, 1001, 1002 and 1003, whereas the set 1001, 1002, 1003 and 1004 would be invalid (since the lowest member is not divisible by four) In the example cited, three tags would be allocated from the group of four available tag values.

During the initialisation sequences the ONU learns any one of its VLAN tags (in this case, any one of the four values allocated) in the same way as described above for the single VLAN case, and stores the value locally. To allow operation with multiple tags, the ONU is configured with the number of tags required. Optionally, this can be done by a management command during or following the initialisation process. The VLAN tag is transmitted as a binary number which, in the Ethernet standard, consists of 12 binary digits (bits). Frames arriving on the PON interface carrying the ONU MAC address in the destination address field are processed in the same way as for the single VLAN case. To allow operation with multiple tags, the ONU compares the VLAN tag in all other downstream frames (those not carrying the MAC address of the ONU) with the stored value, but the comparison process is modified to ignore mismatches in some of the least significant bits. The number of bits ignored is equal to the power to which the number two must be raised to equal the group size. Where four VLAN's are allocated to a single ONU, mismatches in the two least significant bits are ignored. Similarly, where eight VLAN's are allocated to a single ONU, mismatches in the three least significant bits are ignored. In this way, a frame tagged with any of the VLAN values from the contiguous set will be relayed through onto the customer premises interface.

Whilst a particular method of associating VLAN tags with a given ONU has been described above, it will be apparent to the skilled person that other methods would be equally effective. Similarly, it is apparent that the multiple VLAN tags associated with a given ONU need not be contiguous. For example, in a multiple VLAN tag ONU, receipt of a frame addressed to the ONU may add the associated VLAN tag to the stored list rather than overwrite the previously stored VLAN tag. Stored VLAN tags could be removed from the list upon receipt of a frame addressed to the ONU, containing the VLAN tag to be rescinded together with some indication that the frame is to be interpreted as an instruction to remove rather than add a tag. For example one bit of the VLAN tag field could be used to distinguish between frames to add and remove VLAN tags from the stored list, or another bit or bits of the frame could be employed for this purpose.

Preferably, in a multiple VLAN system, the VLAN tag is not removed by the ONU but is passed through onto the customer interface port to allow a downstream customer premises switch or router (FIG. 1) to separate VPN's according to the VLAN tag.

In the upstream direction, traffic is assumed to arrive at the ONU customer port with VLAN tags attached in order to differentiate streams belonging to different VPN's. Preferably, to improve network security, the ONU will check that the VLAN tag already attached to an incoming frame on the customer port is a member of the set of tags allocated to that ONU. If the tag is valid, the ONU will then forward the frame onto the PON interface with the VLAN tag unchanged. If the tag is invalid the ONU may either discard the frame or change the most significant bits of the tag value to force it into the valid range. Preferably, upstream frames which arrive at the ONU untagged should be forwarded to the PON interface with the stored tag value (which was learnt during the initialisation process) inserted. Alternatively, untagged upstream frames could be discarded.

Preferably, an ONU should be configurable for operation in either single VLAN or multiple VLAN modes, Optionally, an ONU will default to single VLAN mode. Preferably, configuration is performed by management messages during or following the initialisation process.

The logical functions associated with the process described in this invention are significantly simpler than known alternative means for establishing a filtering function at the ONU and lend themselves to integration into a single application specific integrated circuit (ASIC). Such an ASIC could also contain the MAC logic for both the PON interface and the local customer connection. The resulting reduction in ONU parts count leads potentially to lower cost and higher reliability.

Reduced ONU complexity also allows operation at lower electrical power levels than the equivalent prior art. This is particularly significant when supplying services which require high availability, even during failure of local electrical power, when battery backup must be used to maintain service.

Optionally, operating power for a Thin ONU can be supplied over a metallic data cable linking the ONU to other customer premises equipment, where the customer premises equipment (such as the bridge/router 112 illustrated in FIG. 1) is equipped with a system to deliver power to remotely connected devices. A specific standard for delivery of operating power over a metallic Ethernet link is under development by IEEE standards group 802.

Conveniently, powering of the Thin ONU over the metallic customer premises network connection allows optional backup batteries to be housed in a relatively benign environment within the customer premises.

even when the ONU itself is externally mounted. Optionally, the Thin ONU can be mounted in a street cabinet. Electrical power can be derived from metallic connections to network based powering equipment, or carried over a metallic connection from the customer premises.

This invention has been described with reference to VLAN tags as the method for differentiating customer traffic. However, as will be clear to anyone skilled in the art, other identification schemes could equally be applied including, for example, Multi-Protocol Label Switching (MPLS) as described in the Internet Engineering Task Force Request for Comment RFC 3032.

Figure 6:
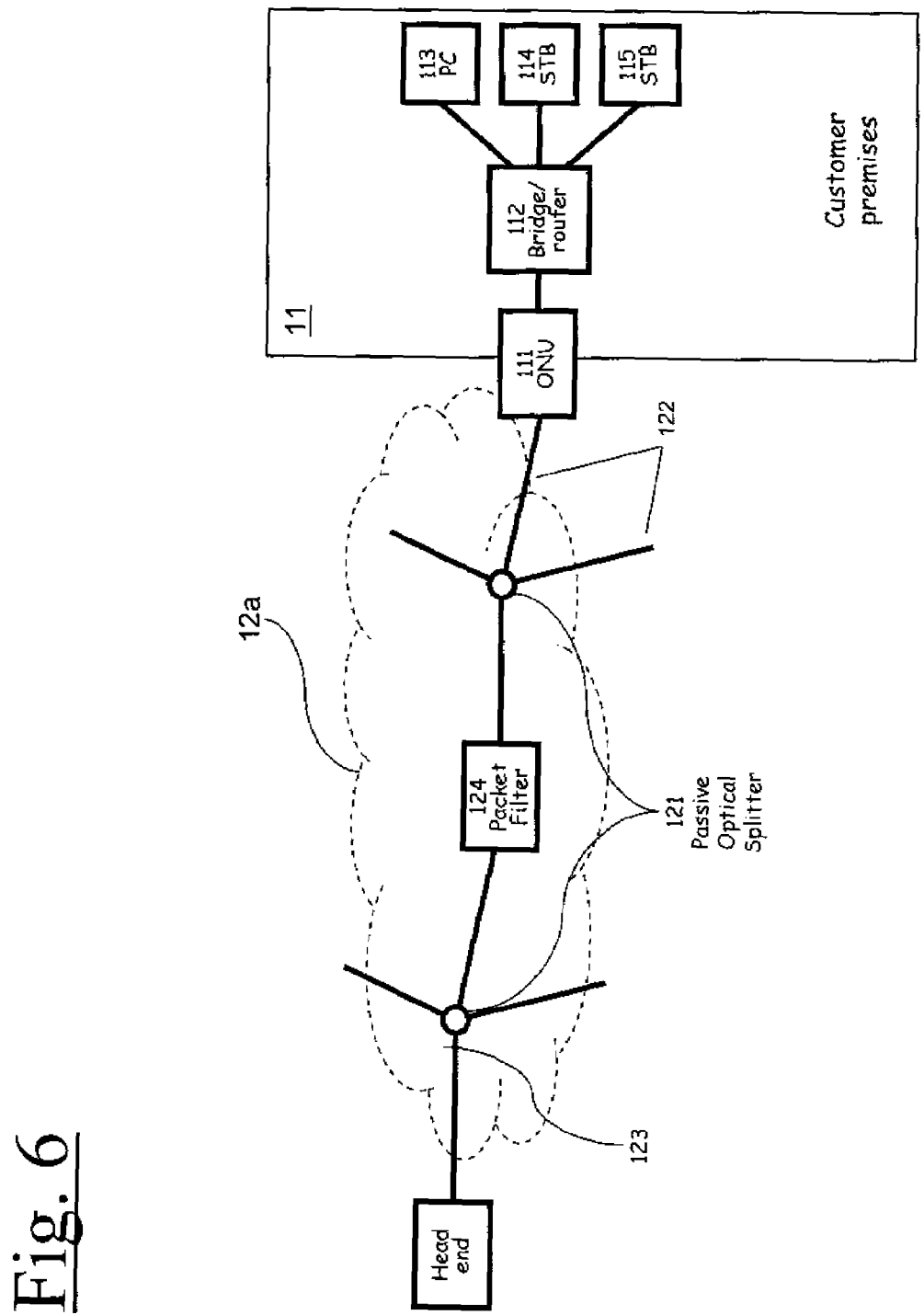
FIG. 6 shows a third example of a PON arrangement in accordance with the present invention.

Referring now to FIG. 6, the filtering method can be applied at multiple points across a network, not just at the customer premises (i.e. the boundary of the operator's network). In particular, the network 12a may be hierarchically structured having multiple optical split points 121. By situating a packet filter 124—having similar functionality to an ONU but supporting optical communication at both the upstream and downstream ports—at an intermediate point within the network, traffic to downstream portions of the network may be filtered prior to downward transmission. In this configuration it is desirable for the intermediate filter 124 to support forwarding of packets carrying any one of a plurality of VLAN tags, and to forward the VLAN tag downstream unchanged; packet differentiation between individual VLAN tags corresponding to individual customer networks may be performed at respective ONU's 111.

Figure 7:
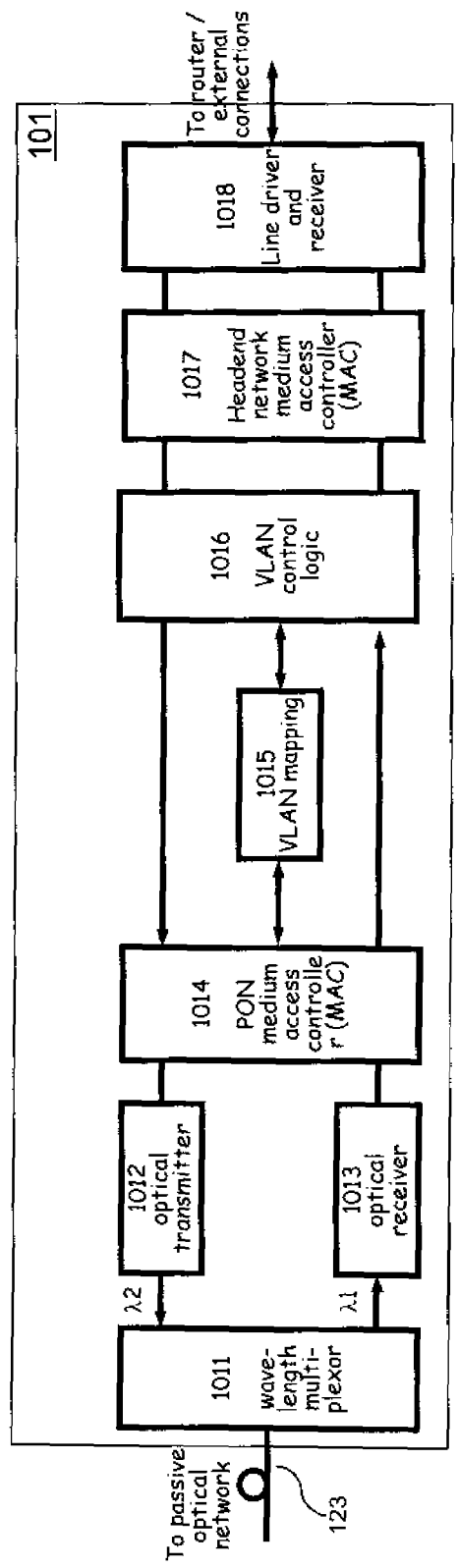
FIG. 7 shows an example of a headend in accordance with the present invention.

Referring now to FIG. 7, at the head end 101, a mapping 1015 between customer premises equipment addresses and VLAN tags must be maintained in order to allow the head end to set the appropriate value of the VLAN tag field before forwarding data received from the network 107 across the local network 12 to ONU's 112.

This can be achieved by constructing and maintaining 1016 a stored mapping 1015 between, for example, Internet Protocol (IP) addresses associated with customer equipment and the Ethernet MAC addresses of the corresponding ONU and customer equipment itself. A VLAN tag can then be allocated by the head end to be associated with traffic to be directed to the customer equipment Ethernet address via the associated ONU. The VLAN tag is then sent over the shared medium 12 addressed 301 to the relevant ONU 112 and containing the allocated VLAN tag 303. Subsequently, data received from the network 107, or indeed from the local network, and addressed to that IP address is sent over the local network in Ethernet frames addressed to the corresponding Ethernet address and importantly having the VLAN tag field set to the previously allocated corresponding VLAN tag.

In this way the head end effectively ensures that data addressed to a particular IP address is only made visible to the corresponding customer by adding 1014 the necessary VLAN tag and ensuring the ONU's are provisioned only to forward frames having the necessary tag. As a consequence, the ONU need only check that the received VLAN tag field has a currently allowed value, rather than maintain information on all IP and Ethernet addresses accessible via the ONU. This leads to a simple, cost-effective functionality in the ONU.

To set up the VLAN tag mapping, the head end may receive requests from the ONU for a VLAN tag to be allocated (e.g. if an ONU receives upstream traffic from a newly-connected subscriber and the ONU identifies it has not yet been allocated a VLAN tag). In response, the head end allocates 1016 a new VLAN tag to the ONU and communicates this 1016 in a downstream frame addressed to the ONU.

Where a previously allocated VLAN tag is no longer required, the ONU may forward a request, from the customer premises, requesting deallocation of the tag. The head end can then effect the deallocation.

The invention can also be applied to other point to multipoint networks, including wireless networks.

Any range or device value given herein may be extended or altered without losing the effect sought, as will be apparent to the skilled person for an understanding of the teachings herein.

The invention claimed is:

1. A method of filtering data packets sent over a passive optical network, the network having a filtering node, each of the packets comprising an address field for addressing nodes of the passive optical network and a filter tag field, the method comprising the steps of, at the filtering node:
    storing a value of a filter tag field;
    receiving data packets subsequently sent over the passive optical network, and
    forwarding the received data packets, other than those addressed to the filtering node, responsive to a comparison between values of their respective filter tag fields and the value of the stored filter tag field, regardless of the value of their respective address fields.

2. A method of filtering data packets sent over a passive optical network, the network having a filtering node, each comprising an address field for addressing nodes of the passive optical network and a filter tag field, the method comprising the steps of, at a filtering node:
    receiving a first data packet addressed, by means of the address field, to the filtering node;
    storing the value of the filter tag field of the first data packet;
    receiving data packets subsequently sent over the passive optical network;
    forwarding the received data packets, other than those addressed to the filtering node, responsive to a comparison between values of their respective filter tag fields and the value of the filter tag field of the first data packet, regardless of the value of their respective address fields.

3. A method according to claim 2 in which the data packets are Ethernet data packets.

4. A method according to claim 3 in which the filter tag field is a Ethernet VLAN tag field.

5. A method according to claim 2 in which the filter tag field is an MPLS label.

6. A method of filtering a stream of data packets sent over a passive optical network, the passive optical network having a filtering node, each of the packets comprising an address field for addressing nodes of the passive optical network and a filter tag field, the method comprising the steps of, at the filtering node:
    receiving a data packet sent to the filtering node over the passive optical network;
    if the address field of the data packet contains the address of the filtering node, storing the value of the filter tag field of the data packet;
    if the address field of the data packet does not contain the address of the filtering node, forwarding the data packet responsive to a comparison between the filter tag field of the data packet and a previously stored filter tag value.

7. A data packet filter node of a passive optical network, the node comprising:
    a input port arranged to receive a stream of data packets sent to the node over the passive optical network, each of the data packets comprising an address field for addressing nodes of the passive optical network and an filter tag field;
    an output port arranged to output a stream of data packets each having an address field; and
    a processor and store;

the processor being arranged to receive, at the input port, a first data packet addressed, by means of the address field of the packet, to the data packet filter; to store the value of the filter tag field of the first data packet in the store; to forward subsequent data packets received at the first port responsive to a comparison between values of their respective filter tag fields and the stored value of the filter tag field, regardless of the value of their respective address fields.

8. A data packet filter according to claim 7 in which the data packets are Ethernet data packets.

9. A data packet filter according to claim 8 in which the filter tag field is a Ethernet VLAN tag field.

10. A data packet filter according to claim 7 in which the filter tag field is an MPLS label.

11. A data packet filter according to claim 7 in which the input port is one of an optical port and a wireless port.

12. A data packet filter as claimed in claim 7, and arranged to add tags to upstream traffic.

13. A data packet filter as claimed in claim 7, and arranged to remove said tags prior to forwarding said packets to a customer.

14. A passive optical communications network comprising at least one data packet filter, the filter comprising:
 a input port arranged to receive a stream of data packets sent to the filter over the passive optical network, each of the data packets comprising an address field for addressing nodes of the passive optical network and an filter tag field;
 an output port arranged to output a stream of data packets each having an address field; and
 a processor and store;
 the processor being arranged to receive, at the input port, a first data packet addressed, by means of the address field of the packet, to the data packet filter; to store the value of the filter tag field of the first data packet in the store; to forward subsequent data packets received at the first port responsive to a comparison between values of their respective filter tag fields and the stored value of the filter tag field, regardless of the value of their respective address fields.

15. A passive optical communications network comprising:
 a headend node having an output port;
 a plurality of data packet filters the filters comprising:
 a input port arranged to receive a stream of data packets each comprising an address field for addressing nodes of the passive optical network and a filter tag field;
 an output port arranged to output a stream of data packets each having an address field; and
 a processor and store;
 the processor being arranged to receive, at the input port, a first data packet addressed, by means of the address field of the packet, to the data packet filter; to store the value of the filter tag field of the first data packet in the store; to forward subsequent data packets received at the first port responsive to a comparison between values of their respective filter tag fields and the stored value of the filter tag field, regardless of the value of their respective address fields;
 the passive optical network further comprising a shared downstream passive optical medium connecting the output port of the headend node to respective input ports of each of the plurality of data packet filters;
 in which data packets output at the output port of the headend node are transmitted over the shared downlink medium to each of the plurality of data packet filters.

16. A communications network according to claim 15 in which the shared downstream medium is one of an optical medium and a wireless medium.

17. A communications network according to claim 15 being a telecommunications access network.

18. A program for a computer on a computer-readable medium for use by a filtering node of a passive optical network, and comprising:
 a first portion arranged to receive a stream of data packets each comprising an address field for addressing nodes of the passive optical network and a filter tag field, the first portion being arranged to store a value of the filter tag field:
 a second portion arranged to forward data packets subsequently sent to the filtering node over the passive optical network, other than those addressed to the filtering node, responsive to a comparison between values of their respective filter tag fields and the value of the stored filter tag field, regardless of the value of their respective address fields.

19. An application specific integrated circuit for use in a filtering node of a passive optical network and comprising:
 a first portion arranged to receive a stream of data packets each comprising an address field for addressing nodes of the passive optical network and a filter tag field, the first portion being arranged to store a value of the filter tag field:
 a second portion arranged to forward data packets subsequently sent to the filtering node over the passive optical network, other than those addressed to the filtering node, responsive to a comparison between values of their respective filter tag fields and the value of the stored filter tag field, regardless of the value of their respective address fields.

20. A method of transmitting data from a head end of a point-to-multipoint passive optical network comprising the steps of; at the head end:
 storing an association between destination addresses of the passive optical network and filter tag values, each filter tag value being associated with a filter node reachable via the point-to-multipoint passive optical network;
 receiving items of data, each directed to a respective destination address;
 identifying for each item of data a stored filter tag value associated with the destination address; and
 forwarding the items of data over the point-to-multipoint passive optical network to their respective destination addresses in at least one data packet comprising an address field for addressing nodes in the passive optical network, and the filter tag value associated with the respective destination address.

21. A method according to claim 20 additionally comprising the steps of:
 receiving a request to associate a new filter tag value with a filter unit having an address accessible via the network;
 updating the association to include a mapping between the address and a new filter tag value;
 sending a message over the network, addressed to the address of the fitter unit, and containing the new filter tag value.

22. A method according to claim 21 additionally comprising the steps of:
 receiving a request to disassociate a filter tag value from a filter unit having an address accessible via the network;

updating the association to omit any mapping between the address and the filter tag value.

23. A head end for a point-to-multipoint passive optical network, the head end comprising:

a store arranged for storing an association between destination addresses and filter tag values, each filter tag value being associated with a filter node reachable via the network;

an input port arranged to receive items of data each directed to a respective destination address;

a processor arranged to identify a stored filter tag value associated with each of the respective destination addresses and to forward the data to their respective destination addresses over the passive optical network in at least one data packet comprising an address field for addressing nodes in the passive optical network, and the filter tag value associated with the respective destination address.

24. A computer-readable medium storing a computer program for use by a head end of a point-to-multipoint passive optical network, the passive optical network having a filter node and the program having code portions when executed by a computer arranged to:

store an association between destination address and filter tag values, each filter tag value being associated with the filter node reachable via the point-to-multipoint network;

receive items of data each directed to a respective destination address;

identify for each item a stored filter tag value associated with the respective destination address;

forward the data to their respective destination addresses over the point-to-multipoint passive optical network in at least one data packet comprising an address field for addressing nodes in the passive optical network, and the filter tag value associated with the respective destination address.

* * * * *